United States Patent
Arndt et al.

(10) Patent No.: US 10,510,254 B2
(45) Date of Patent: Dec. 17, 2019

(54) METHOD AND SYSTEM FOR PROCESSING CROSSWIND LOAD DATA FOR A MOTOR VEHICLE

(71) Applicant: Ford Global Technologies, LLC, Dearborn, MI (US)

(72) Inventors: Christoph Arndt, Moerlen Rheinland-Pfalz (DE); Manfred Mueller, Aachen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 260 days.

(21) Appl. No.: 15/611,146

(22) Filed: Jun. 1, 2017

(65) Prior Publication Data
US 2017/0352276 A1 Dec. 7, 2017

(30) Foreign Application Priority Data
Jun. 2, 2016 (DE) .................. 10 2016 209 678

(51) Int. Cl.
*G08G 1/16* (2006.01)
*G08G 1/01* (2006.01)
(Continued)

(52) U.S. Cl.
CPC ........... *G08G 1/166* (2013.01); *B62D 15/025* (2013.01); *G05D 1/0214* (2013.01); *G08G 1/012* (2013.01);
(Continued)

(58) Field of Classification Search
CPC ............. G08G 1/166; G08G 1/096775; G08G 1/09675; G08G 1/096716; G08G 1/04;
(Continued)

(56) References Cited

U.S. PATENT DOCUMENTS

| 6,072,387 A | * 6/2000 | Overbeck ................ B60Q 1/52 340/425.5 |
| 6,722,610 B1 | * 4/2004 | Rawdon ............... B62D 7/1509 244/103 W |

(Continued)

FOREIGN PATENT DOCUMENTS

| CN | 104331611 A | 2/2015 |
| CN | 204178560 | 2/2015 |
| DE | 102004027432 A1 | 8/2005 |
| DE | 102014215259 A1 | 2/2016 |

OTHER PUBLICATIONS

Examination Report dated Mar. 2, 2017 for DE 10 2016 209 678.8 filed Jun. 2, 2016, 6 pgs.

*Primary Examiner* — Jason Holloway
(74) *Attorney, Agent, or Firm* — Frank Lollo; Brooks Kushman P.C.

(57) ABSTRACT

For operating a motor vehicle, a travel path of the motor vehicle across a roadway section of a roadway situated ahead of the motor vehicle and in the direction of travel of the motor vehicle is ascertained. The travel path is defined by an instantaneous running condition of the motor vehicle, a virtual local map that contains instantaneous local wind conditions, an instantaneous location of the motor vehicle on the virtual local map, and information relating to the instantaneous environment of the motor vehicle. The ascertained travel path is used for actuating at least one device of the motor vehicle that influences the instantaneous running condition of the motor vehicle.

16 Claims, 2 Drawing Sheets

(51) Int. Cl.
*G08G 1/04* (2006.01)
*G08G 1/0967* (2006.01)
*G08G 1/0962* (2006.01)
*B62D 15/02* (2006.01)
*G05D 1/02* (2006.01)
*G06K 9/00* (2006.01)

(52) U.S. Cl.
CPC ......... *G08G 1/0112* (2013.01); *G08G 1/0129* (2013.01); *G08G 1/0133* (2013.01); *G08G 1/0141* (2013.01); *G08G 1/04* (2013.01); *G08G 1/09626* (2013.01); *G08G 1/09675* (2013.01); *G08G 1/096716* (2013.01); *G08G 1/096775* (2013.01); *G06K 9/00791* (2013.01)

(58) Field of Classification Search
CPC .. G08G 1/0141; G08G 1/0129; G08G 1/0112; G08G 1/0133; G08G 1/012; G08G 1/09626; G06K 9/00791; B62D 15/025; G05D 1/0214
See application file for complete search history.

(56) References Cited

U.S. PATENT DOCUMENTS

| | | | |
|---|---|---|---|
| 6,726,120 B2 * | 4/2004 | Schaffter | A01B 79/005 239/159 |
| 2003/0111546 A1 * | 6/2003 | Schaffter | A01B 79/005 239/69 |
| 2013/0276688 A1 * | 10/2013 | Ekuni | B63H 25/04 114/162 |
| 2014/0303870 A1 * | 10/2014 | Switkes | G08G 1/166 701/96 |
| 2014/0371948 A1 * | 12/2014 | Yang | B60W 50/0098 701/1 |
| 2015/0039183 A1 * | 2/2015 | Yang | B60W 30/025 701/38 |
| 2015/0367850 A1 * | 12/2015 | Clarke | B60W 30/00 701/28 |
| 2015/0375837 A1 * | 12/2015 | Johnson | G01P 21/025 701/21 |
| 2018/0092302 A1 * | 4/2018 | Vandike | A01D 41/127 |

* cited by examiner

METHOD AND SYSTEM FOR PROCESSING CROSSWIND LOAD DATA FOR A MOTOR VEHICLE

CROSS-REFERENCE TO RELATED APPLICATIONS

This application claims foreign priority benefits under 35 U.S.C. § 119(a)-(d) to DE Application 10 2016 209 678.8 filed Jun. 2, 2016, which is hereby incorporated by reference in its entirety.

TECHNICAL FIELD

This disclosure relates to a system for processing data relating to crosswind loads acting on a motor vehicle.

BACKGROUND

Motor vehicles are exposed to various wind loads during travel. In particular, a traveling motor vehicle may be exposed to a crosswind, which, depending on location, may vary considerably. Depending on intensity, the crosswind may result in a strong lateral—in particular, sudden—swerving of the motor vehicle. In particular, an additional yawing moment may be generated by a crosswind, since the center of gravity of the motor vehicle is not situated at the same place as the aerodynamic center of the motor vehicle. This swerving can be compensated by a counter-steering of the motor vehicle.

Since a crosswind acts on a lateral surface of a motor vehicle, the crosswind loads increase with large lateral surfaces, and with vehicle centers of gravity situated geodetically higher up. In particular, the crosswind loads acting on a larger motor vehicle, for instance an SUV (Sport Utility Vehicle), are greater on account of the larger lateral surface area, particularly with regard to the greater height of the vehicle, than in the case of smaller motor vehicles. Larger motor vehicles therefore react more sensitively to a crosswind.

DE 197 05 635 A1 discloses an apparatus for triggering a control procedure and/or warning procedure in a motor vehicle with a device for ascertaining the actual value of the crosswind really acting on the motor vehicle. A limiting-value determination-and-evaluation device for ascertaining a limiting value of the crosswind speed depending on the current driving conditions of the vehicle is arranged in the motor vehicle. The values detected by the device for ascertaining the actual value of the crosswind are supplied to the limiting-value determination-and-evaluation device and compared with the ascertained limiting values of the crosswind speed. Depending on this comparison, a driver-information device and/or a vehicle-control device is/are actuated. For instance, depending on this comparison a vehicle speed can be reduced. The limiting-value determination-and-evaluation device can receive the actual values of the crosswind via a mobile radio receiver.

SUMMARY

It is an object of the disclosure to enhance the ride safety in driving a motor vehicle.

By a method according to the disclosure for operating a motor vehicle, a travel path of the motor vehicle across a roadway section of a roadway situated ahead of the motor vehicle in the direction of travel of the motor vehicle is ascertained, taking into consideration an instantaneous running condition of the motor vehicle, a virtual local map that contains instantaneous local wind conditions, an instantaneous location of the motor vehicle on the virtual local map, and information relating to the instantaneous environment of the motor vehicle. The ascertained travel path is used for actuating at least one device of the motor vehicle influencing a running condition of the motor vehicle.

In accordance with the disclosure, the motor vehicle is guided as safely as possible along the ascertained travel path across the roadway. The travel path is ascertained before the motor vehicle drives along the roadway section of the roadway situated ahead of the motor vehicle in the direction of travel of the motor vehicle in accordance with the ascertained travel path. In accordance with the disclosure a driving situation coming toward the motor vehicle—or, to be more exact, wind loads, in particular crosswind loads, coming toward the motor vehicle—is/are registered looking ahead, and used for the advance ascertainment of the travel path. The ascertained travel path looking ahead of the motor vehicle is subsequently used for actuating the device of the motor vehicle influencing the running condition of the motor vehicle, which guides the motor vehicle as safely as possible along the ascertained travel path across the roadway. A driver of the motor vehicle, consequently, does not exclusively have to find a travel path that is as safe as possible across the roadway situated ahead of the motor vehicle. In addition, the situation is avoided where the driver is startled, or made uncertain, by the wind loads arising while driving along the roadway section situated ahead. Consequently, with the method per the disclosure, the ride safety while driving the motor vehicle is enhanced.

The travel path is ascertained by taking an instantaneous running condition of the motor vehicle into consideration. An instantaneous running condition of the motor vehicle may be, for instance, the speed of travel of the motor vehicle, a mechanical load acting on the motor vehicle by virtue of a surface condition of the roadway, an accelerating force acting instantaneously on the motor vehicle that is caused by the inertia of the motor vehicle, or the like.

The virtual local map that contains instantaneous local wind conditions on various roadway sections, for instance on bridge sections, is preferentially supplied to the motor vehicle—or, to be more exact, to a data-processing unit of the vehicle—via a communications network. For this purpose, at least one central communications unit that is separate from the motor vehicle may is provided, which at certain time-intervals feeds updated virtual local maps into the communications network. The data-processing unit is programmed to receive the updated virtual local maps via a wireless communications link to the communications network. To ascertain a safe travel path across the roadway section situated ahead, a current virtual local map is accordingly always available. The virtual local map preferentially contains information relating to a wind strength and direction with respect to the roadway section situated ahead. The wind conditions contained in the virtual local map can be ascertained using kriging.

The locality of the virtual map is preferentially dependent upon the instantaneous location of the motor vehicle. The instantaneous location of the motor vehicle can, for instance, be captured via a navigation system of the motor vehicle or via a position-fixing of a mobile radio terminal located in the motor vehicle. The instantaneous location of the motor vehicle can be communicated, via the communications network, to the central communications unit, which may isbe programmed to make a virtual local map that is selected in a manner depending on the instantaneous location of the motor vehicle available to the motor vehicle. The motor vehicle may, for instance, download a current virtual local map from the communications network whenever the motor vehicle is started. By the navigation system of the motor vehicle, or via a position-fixing of a mobile radio terminal located in the motor vehicle, an instantaneous location of the motor vehicle on the virtual local map can be ascertained of the data-processing unit. Correspondingly, a virtual local map relating to the respective location of the motor vehicle can be supplied in each instance to a plurality of motor vehicles. The virtual local map may additionally also contain weather data that are received from local meteorological measurements and/or from weather reports. The wind conditions contained in the virtual local map can be derived, at least partly, from local measurements of wind conditions, for instance on bridges. The virtual local map can be updated at predetermined time-intervals.

An item of information relating to the instantaneous environment of the motor vehicle may be, for instance, an item of information relating to a contour (curves, camber, etc.) of the roadway situated ahead, a surface condition (coefficient of friction, ruts, etc.) of the roadway, an item of information relating to a position of an object—in particular, of a further vehicle—relative to the motor vehicle, or the like. From this information, at least one free space available for the motor vehicle on the roadway section situated ahead can be ascertained and used for ascertaining the safe travel path through this available free space. If the wind is coming from one side of the roadway section situated ahead, the motor vehicle can be rerouted in the lane in advance in the direction of this side in accordance with the safe travel path, particularly if no further traffic or no vehicle traveling ahead is present on the roadway section. If, on the other hand, vehicles are present on the roadway section situated ahead, the safe travel path should be chosen such that a lateral spacing, particularly from vehicles traveling on the wind side, is as large as possible to minimize a risk of lateral collision.

According to an advantageous configuration, the ascertained travel path is used for actuating a steering-assisting device of the motor vehicle. The steering-assisting device may conventionally take the form of part of a power-steering system and can be used for assisting steering inputs of the driver, or for autonomous steering of the vehicle along the ascertained travel path. In the latter case, the steering-assisting device can be interrupted or terminated in the event of a steering intervention by the driver. Alternatively or additionally, the ascertained travel path can be used for actuating an engine management system of the motor vehicle, for instance in order to vary, in particular to decrease, a speed of travel and/or to adhere to a safety spacing, ascertained from the wind loads to be expected, from a vehicle traveling ahead. For instance, the extent of a probable lateral swerving motion of the motor vehicle can be ascertained taking crosswind loads to be expected into consideration, in which case the lateral swerving motion is taken into consideration in the ascertainment of the safe travel path.

According to a further advantageous configuration, crosswind loads acting instantaneously on the motor vehicle are registered in location-dependent and time-dependent manners by a sensor-electronics unit arranged on the motor vehicle, and data relating to the registered crosswind loads are transmitted via a wireless communications link to a central communications unit, which is separate from the motor vehicle and is programmed to generate a virtual local map that contains instantaneous local wind conditions. The sensor-electronics unit may, for instance, is programmed to capture an instantaneous steering angle of a steering wheel of the motor vehicle, an instantaneous yaw-rate of the motor vehicle, a transverse acceleration of the motor vehicle, and/or a speed of travel of the motor vehicle. The sensor-electronics unit may have, for instance, a sensor for capturing a transverse acceleration of the motor vehicle or, particularly in the case of motor vehicles having a greater vehicle height, for capturing a roll-rate of the motor vehicle. In particular, existing sensors of a motor vehicle may be used for registering the crosswind loads, enabling a cost-effective implementation of the method. By transmission of the data relating to the registered crosswind loads via a wireless communications link to the central communications unit, which is separate from the motor vehicle, current locally and temporally resolved wind data are supplied to the central communications unit, the wind data being used by the central communications unit for generating a current virtual local map. This map can then be transmitted to a data-processing unit of the motor vehicle via a wireless communications network, to be able to ascertain the safe travel path.

A further advantageous configuration provides that an instantaneous relative position of the motor vehicle in a lane of the roadway and/or an instantaneous spacing of the motor vehicle from at least one vehicle traveling ahead is/are used by way of information relating to the instantaneous environment of the motor vehicle. The instantaneous position of the motor vehicle in the lane of the roadway can be used to ascertain what scope a steering assistance must have to guide the motor vehicle along the travel path ascertained in advance. If, for instance, crosswind loads are to be expected that act on the motor vehicle from the right, the travel path can be ascertained such that the motor vehicle is guided in advance along the right-hand edge of the lane. This makes lateral swerving motions of the motor vehicle possible. The lateral swerving motions are caused by the crosswind loads acting on the motor vehicle, without the motor vehicle leaving the lane toward the left, which would be associated with a risk of lateral collision. If, in such a situation, it is detected, by way of information relating to the instantaneous environment of the motor vehicle, that the motor vehicle is already traveling instantaneously along the right-hand edge of the lane, then, in the course of action of the crosswind loads on the motor vehicle from the right, a slighter steering assistance is required than if in such a situation it is detected, by way of information relating to the instantaneous environment of the motor vehicle, that the motor vehicle is traveling instantaneously along the left-hand edge of the lane. By using an instantaneous spacing of the motor vehicle from at least one vehicle traveling ahead by way of information relating to the instantaneous environment of the motor vehicle, it can be ascertained whether in the event of the crosswind loads to be expected—and in the event of a lateral swerving motion, resulting therefrom, of the vehicle traveling ahead—there is a sufficient safety spacing from the vehicle traveling ahead to reduce a risk of lateral collision.

Advantageously, at least one item of information relating to the instantaneous environment of the motor vehicle is captured by at least one image-capture unit looking at least in the direction of travel. The image-capture unit may have at least one camera, in particular a monoscopic camera or stereoscopic camera, at least one LiDAR system and/or at least one radar system, in order to be able to capture at least one item of information relating to the instantaneous environment of the motor vehicle, in the form of an image file with depth information.

According to a further advantageous configuration, a travel behavior of at least one motor vehicle traveling ahead is ascertained, taking into consideration the virtual local map and information relating to the instantaneous environment of the motor vehicle, and taken into consideration in the ascertainment of the travel path. Vehicles traveling ahead execute swerving motions because of the crosswind loads acting on them, which is derived from the virtual local map. Whether vehicles traveling ahead are present can be captured by way of information relating to the instantaneous environment of the motor vehicle. The swerving motions of the vehicles traveling ahead are ascertained by way of travel behavior of these vehicles. Consequently, these swerving motions can be taken into consideration in ascertaining the safe travel path across the roadway section situated ahead.

An entry time and/or an entry location at which the motor vehicle enters the ascertained travel path may be ascertained. A lateral wind shadow of a vehicle traveling ahead, and an exit time and/or an exit location at which the motor vehicle exits the ascertained travel path may also be ascertained. The lateral wind shadow of the vehicle traveling ahead takes into consideration the instantaneous running condition of the motor vehicle, and information relating to the instantaneous environment of the motor vehicle. Whenever a motor vehicle enters or exits a lateral wind shadow of a truck, differences in the crosswind loads acting on the motor vehicle may suddenly arise. This is taken into consideration in the ascertainment of the safe travel path. For instance, the safe travel path may be such that, upon entry and upon exit of the motor vehicle into and out of a lateral wind shadow of a truck, counter-steering measures are automatically initiated early, or at a right time by a steering-assisting device, taking the safe travel path into consideration.

A motor vehicle according to the disclosure includes at least one data-processing unit and at least one device capable of being actuated with the data-processing unit and influencing a running condition of the motor vehicle. The data-processing unit is programmed to ascertain, taking into consideration an instantaneous running condition of the motor vehicle, a virtual local map that contains instantaneous local wind conditions, an instantaneous location of the motor vehicle on the virtual local map, and information relating to the instantaneous environment of the motor vehicle. The data-processing unit also ascertains a travel path of the motor vehicle across a roadway section of a roadway situated ahead of the motor vehicle in the direction of travel of the motor vehicle, and actuates the device in a manner depending on the ascertained travel path.

The advantages stated above regarding the method are associated correspondingly with the motor vehicle. The motor vehicle can be used for implementing the method per one of its configurations or an arbitrary combination of at least two of these configurations with one another. The data-processing unit may is formed separately or by an implementation of suitable software in an existing electronics unit of the vehicle. The motor vehicle may be an automobile or a truck.

According to an advantageous configuration, the device is a steering-assisting device of the motor vehicle. The advantages stated above with reference to the corresponding configuration of the method are associated correspondingly with this configuration.

According to a further advantageous configuration, the motor vehicle includes at least one sensor-electronics unit. The sensor-electronics unit is connected to the data-processing unit by communications technology, which is programmed for the location and time-dependent capture of crosswind loads acting instantaneously on the motor vehicle, The data-processing unit is programmed to transmit data relating to the registered crosswind loads via a wireless communications link to a central communications unit, which is separate from the motor vehicle and is programmed to generate a virtual local map that contains instantaneous local wind conditions. The advantages stated above with reference to the corresponding configuration of the method are associated correspondingly with this configuration.

A further advantageous configuration provides that the data-processing unit is programmed to ascertain, taking into consideration the information relating to the instantaneous environment of the motor vehicle, an instantaneous relative position of the motor vehicle in a lane of the roadway and/or an instantaneous spacing of the motor vehicle from at least one vehicle traveling ahead. The advantages stated above with reference to the corresponding configuration of the method are associated correspondingly with this configuration It is, moreover, an advantage if the motor vehicle has at least one image-capture unit, connected to the data-processing unit by communications technology, and looking at least in the direction of travel. The image-capture unit is programmed to capture at least one item of information relating to the instantaneous environment of the motor vehicle. The advantages stated above with reference to the corresponding configuration of the method are associated correspondingly with this configuration.

Advantageously, the data-processing unit is programmed to estimate, taking into consideration the virtual local map and the information relating to the instantaneous environment of the motor vehicle, a travel behavior of at least one motor vehicle traveling ahead on the roadway. The data-processing unit is also programmed to take said travel behavior into consideration in the ascertainment of the travel path. The advantages stated above with reference to the corresponding configuration of the method are associated correspondingly with this configuration.

According to a further advantageous configuration, the data-processing unit is programmed to ascertain, taking into consideration the instantaneous running condition of the motor vehicle and the information relating to the instantaneous environment of the motor vehicle, an entry time and/or an entry location at which the motor vehicle enters the ascertained travel path, or a lateral wind shadow of a vehicle traveling ahead. The data-processing unit is also programmed to ascertain an exit time and/or an exit location at which the motor vehicle exits the ascertained travel path, or the lateral wind shadow of the vehicle traveling ahead. The advantages stated above with reference to the corresponding configuration of the method are associated correspondingly with this configuration.

A system according to the disclosure for processing data relating to crosswind loads acting on a motor vehicle includes at least one motor vehicle according to one of the aforementioned configurations or according to an arbitrary combination of at least two of these configurations with one another, and at least one central communications unit arranged separately from the motor vehicle. The central communications unit is programmed to generate a current virtual local map that contains instantaneous local wind conditions, and to feed the current virtual local map into a communications network. It is also possible for the data-processing unit to be connected to the communications network by communications technology.

The advantages stated above regarding the method are associated correspondingly with the system. The system can be used for implementing the method per one of its configurations or an arbitrary combination of at least two of these configurations with one another. The system may have a plurality of corresponding motor vehicles.

The disclosure will be elucidated in exemplary manner in the following regarding the appended figures based on preferred embodiments, wherein the features presented below, in each instance both considered in themselves and in various combinations with one another, may represent a further developed or advantageous aspect of the disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
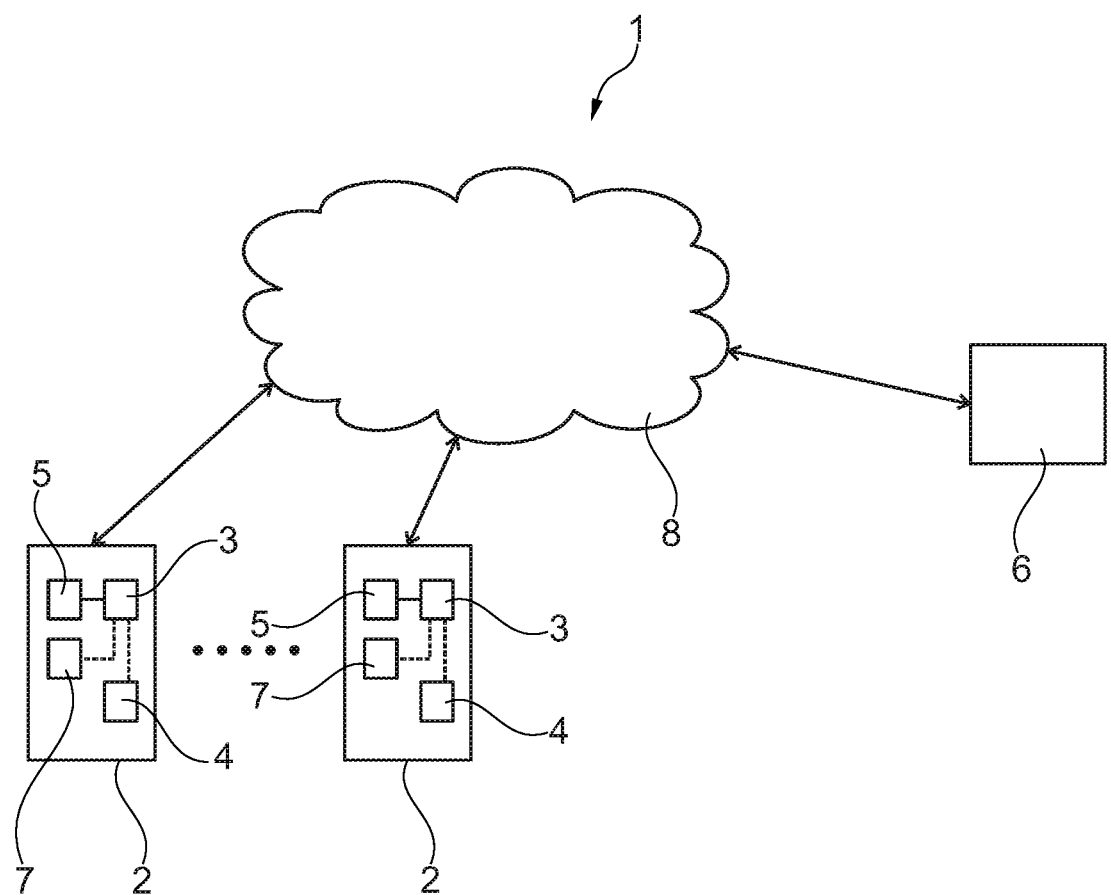
FIG. 1 a schematic representation of an exemplary embodiment of a system according to the disclosure.

FIG. 1 shows a schematic representation of an exemplary embodiment of a system 1 according to the disclosure for processing data relating to crosswind loads acting on a motor vehicle 2. It should be noted that the units shown in the figures and described may be designed as hardware components and/or as software components.

The system 1 includes a plurality of motor vehicles 2. Each motor vehicle 2 includes a data-processing unit 3 and a device 4. The device 4 is capable of being actuated with the data-processing unit 3 and influencing a running condition of the motor vehicle 2.

The data-processing unit 3 is programmed to ascertain, taking into consideration an instantaneous running condition of the motor vehicle 2, a virtual local map that contains instantaneous local wind conditions, an instantaneous location of the motor vehicle 2 on the virtual local map, and information relating to the instantaneous environment of the motor vehicle 2. The data-processing unit 3 is also programmed to ascertain a travel path of the motor vehicle 2 across a roadway section of a roadway situated ahead of the motor vehicle 2 in the direction of travel of the motor vehicle 2, and to actuate the device 4 in a manner depending on the ascertained travel path. The device 4 may be a steering-assisting device of the motor vehicle 2.

Each motor vehicle 2 includes, in addition, a sensor-electronics unit 5, connected to the data-processing unit 3 by communications technology, which is programmed for the location-dependent and time-dependent capture of crosswind loads acting instantaneously on the motor vehicle 2. The data-processing unit 3 is programmed to transfer data relating to the registered crosswind loads via a wireless communications link to a central communications unit 6 that is separate from the motor vehicle 2 and is programmed to generate a virtual local map that contains instantaneous local wind conditions.

Each data-processing unit 3 may be programmed to ascertain, taking into consideration the information relating to the instantaneous environment of the motor vehicle 2, an instantaneous relative position of the motor vehicle 2 in a lane of the roadway and/or an instantaneous spacing of the motor vehicle 2 from at least one vehicle traveling ahead.

Each motor vehicle 2 includes, moreover, an image-capture unit 7, connected to the data-processing unit 3 by communications technology and looking at least in the direction of travel. The image-capture unit 7 is programmed to capture at least one item of information relating to the instantaneous environment of the motor vehicle 2.

Each data-processing unit 3 may be programmed to estimate, taking into consideration the virtual local map and the information relating to the instantaneous environment of the motor vehicle 2, a future travel behavior of at least one vehicle traveling ahead on the roadway, and to take the travel behavior into consideration in the ascertainment of the travel path.

Moreover, each data-processing unit 3 may be programmed to ascertain, taking into consideration the instantaneous running condition of the motor vehicle 2 and the information relating to the instantaneous environment of the motor vehicle 2, an entry time and/or an entry location at which the motor vehicle 2 enters the ascertained travel path, or a lateral wind shadow of a vehicle traveling ahead and an exit time and/or an exit location at which the motor vehicle 2 exits the ascertained travel path, or the lateral wind shadow of the vehicle traveling ahead.

The system 1 includes the central communications unit 6 arranged separately from the motor vehicles 2. The central communications unit 6 is programmed to generate a current virtual local map that contains instantaneous local wind conditions and to feed the current virtual local map into a wireless communications network 8. Each data-processing unit 3 can be connected to the communications network 8 by communications technology.

Figure 2:
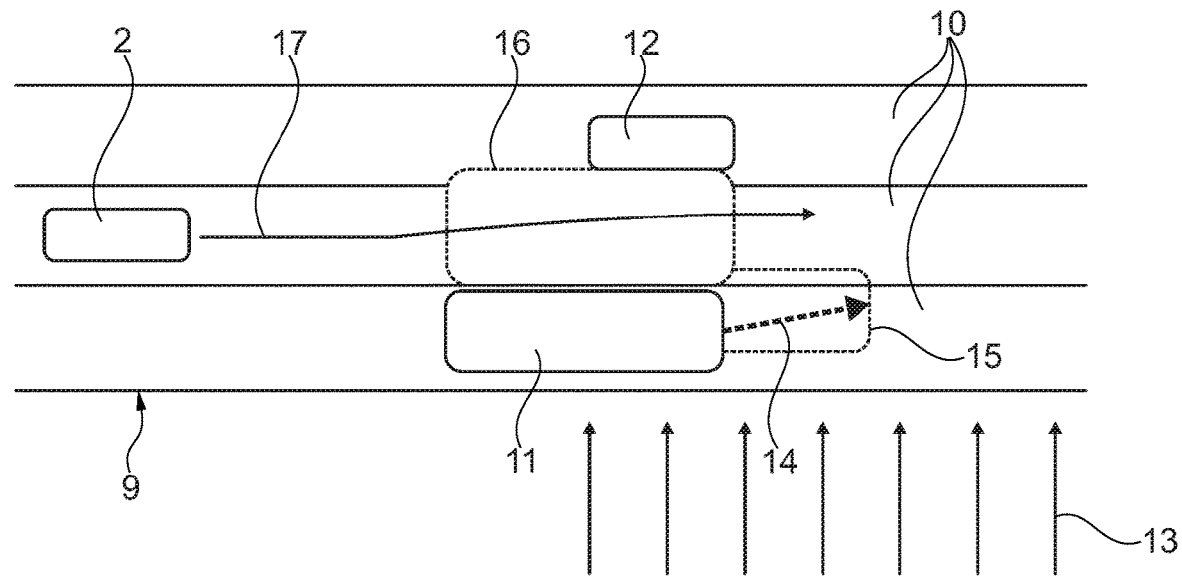
FIG. 2 a schematic representation of an exemplary traffic situation.

FIG. 2 shows a schematic representation of an exemplary traffic situation in which the system and method according to the disclosure are employed. The system may be designed so as to correspond to FIG. 1.

A roadway 9 with three lanes 10 is shown. A motor vehicle 2 according to the disclosure is traveling in the middle lane 10. On a roadway section situated ahead of the motor vehicle 2 in the direction of travel of the motor vehicle 2, a truck 11 is traveling in the right-hand lane 10 and an automobile 12 is traveling in the left-hand lane 10. A crosswind prevailing from the right on the roadway section situated ahead is indicated by the arrows 13.

On account of the crosswind, the truck 11 will undergo a crosswind load that pushes the truck 11 into the position 15 in accordance with the arrow 14. This is accompanied by an elevated risk of lateral collision with respect to the truck 11. This travel behavior is ascertained by means of a data-processing unit, not shown, of the motor vehicle 2. The lateral spacing between the motor vehicle 2 and the truck 11 should, therefore, be maximized. The automobile 12 is pushed, if at all, away from the middle lane 10 by the crosswind load, such that a risk of lateral collision with respect to the automobile 12 remains unchanged, or is reduced.

Between the automobile 12 and the truck 11, a free space 16 for the motor vehicle 2 is present. An image-capture device, not shown, arranged on the motor vehicle 2, captures the free space 16 by way of information relating to the instantaneous environment of the motor vehicle 2. The data-processing unit of the motor vehicle 2 ascertains—taking into consideration an instantaneous running condition of the motor vehicle 2, a virtual local map that contains instantaneous local wind conditions, an instantaneous location of the motor vehicle 2 on the virtual local map, and information relating to the instantaneous environment of the motor vehicle 2. The data-processing unit also ascertains a travel path 17 of the motor vehicle 2 across the roadway section situated ahead of the motor vehicle 2 in the direction of travel of the motor vehicle 2. Subsequently, the data-processing unit actuates a steering-assisting device, not shown, of the motor vehicle 2 in a manner depending on the ascertained travel path 17, so that the motor vehicle 2 is guided along the travel path 17 to the free space 16.

Figure 3:
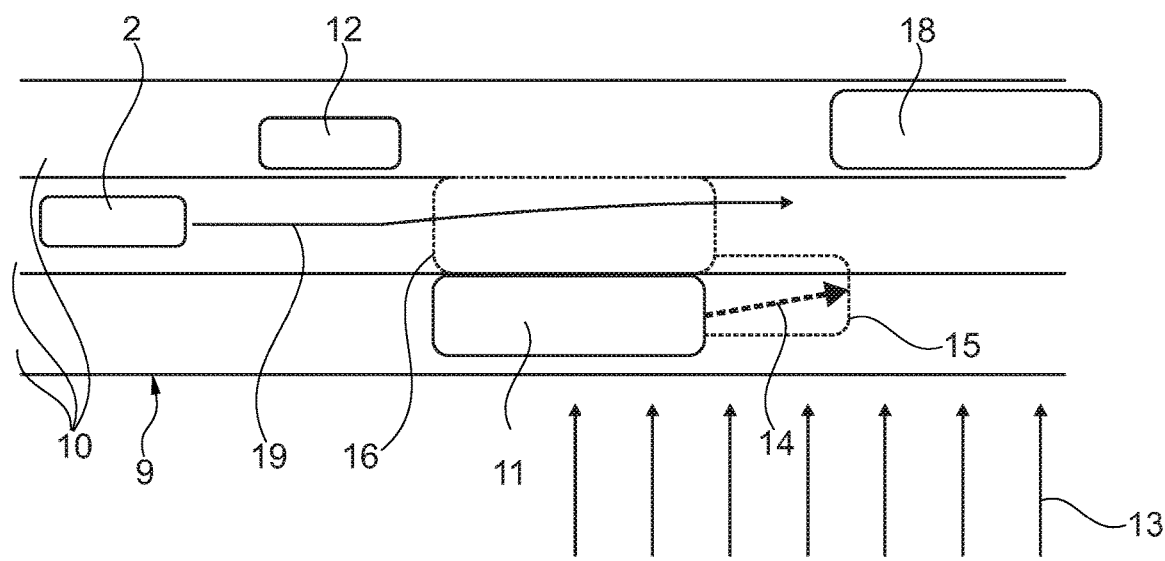
FIG. 3 a schematic representation of a further exemplary traffic situation.

FIG. 3 shows a schematic representation of a further exemplary traffic situation in which the system and method according to the disclosure is employed. The system may be designed to correspond to FIG. 1.

A roadway 9 with three lanes 10 is shown. A motor vehicle 2 according to the disclosure is traveling in the middle lane 10. On a roadway section situated ahead of the motor vehicle 2 in the direction of travel of the motor vehicle 2, a truck 11 is traveling in the right-hand lane 10 and an automobile 12 is traveling in the left-hand lane 10 and, in front of the automobile 12, a larger vehicle 18. A crosswind prevailing from the right on the roadway section situated ahead is indicated by the arrows 13.

On account of the crosswind, the truck 11 will undergo a crosswind load that pushes the truck 11 into the position 15 in accordance with the arrow 14. This is accompanied by an elevated risk of lateral collision with respect to the truck 11. This travel behavior is ascertained by means of a data-processing unit, not shown, of the motor vehicle 2. The lateral spacing between the motor vehicle 2 and the truck 11 should, therefore, be maximized. The automobile 12 is pushed, if at all, away from the middle lane 10 by the crosswind load such that a risk of lateral collision with respect to the automobile 12 remains unchanged or is reduced. In order to reduce this risk of collision further, the data-processing unit of the motor vehicle 2 can ascertain the travel path 19 in accordance with the motor vehicle 2. The motor vehicle 2 is firstly steered to the right-hand edge of the middle lane 10 in the course of overtaking the automobile 12. Subsequently, prior to, and, in the course of overtaking the truck 11, the motor vehicle 2 is steered to the left-hand edge of the middle lane 10 in accordance with the ascertained travel path 19, in order to further reduce a risk of lateral collision with respect to the truck 11. In this process the motor vehicle 2 travels through a free space 16 ascertained by the data-processing unit and available to the motor vehicle 2. For this purpose, information relating to the instantaneous environment of the motor vehicle 2 can be captured by means of an image-capture device, not shown, arranged on the motor vehicle 2. After the motor vehicle 2 has traveled through the free space 16, it can again be steered to the right-hand edge of the middle lane 10, in order to prevent the motor vehicle 2 from colliding laterally with vehicle 18 in the course of being pushed to the left by the crosswind. However, since vehicle 18 is already exposed to the crosswind, it is moving on a rectilinear travel path. The motor vehicle 2 can be steered in the direction of the middle of the middle lane 10 and kept there, for instance, by means of a lane-keeping assistant or the like.

In this connection, the data-processing unit of the motor vehicle 2 ascertains, taking into consideration an instantaneous running condition of the motor vehicle 2, a virtual local map that contains instantaneous local wind conditions, an instantaneous location of the motor vehicle 2 on the virtual local map, and information relating to the instantaneous environment of the motor vehicle 2. The data-processing unit also ascertains the travel path 19 of the motor vehicle 2 across the roadway section situated ahead of the motor vehicle 2 in the direction of travel of the motor vehicle 2. Subsequently the data-processing unit actuates a steering-assisting device, not shown, of the motor vehicle 2 in a manner depending on the ascertained travel path 19 such that the motor vehicle 2 is guided along the travel path 19.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for operating a motor vehicle, comprising:
   ascertaining a travel path of the vehicle across a roadway section situated ahead in a direction of travel, the travel path being defined by a running condition of the vehicle, a virtual map having local wind conditions, a current location of the vehicle on the virtual map, and instantaneous environment data;
   ascertaining a time and location that the vehicle enters a lateral wind shadow of a second vehicle traveling ahead of the vehicle within the travel path, and a time and location that the vehicle exits the lateral wind shadow, the lateral wind shadow being based on the running condition and the environment data; and
   actuating at least one device configured to influence the running condition based on the travel path and the times and locations of the later wind shadow entry and exit.

2. The method as claimed in claim 1, wherein the at least one device is a steering-assisting device.

3. The method as claimed in claim 1 further comprising registering crosswind loads acting on the vehicle in each of a location-dependent and time-dependent manner using a sensor-electronics unit, wherein data relating to the crosswind loads are transmitted via a wireless communications link to a central communications unit that is separate from the vehicle and programmed to generate the virtual map.

4. The method as claimed in claim 1 further comprising using a relative position of the vehicle in a lane of the roadway section and a spacing of the vehicle from at least one vehicle traveling ahead, the relative position and the spacing being ascertained from the environment data.

5. The method as claimed in claim 1, wherein the environment data is captured using at least one image-capture unit looking at least in the travel direction.

6. The method as claimed in claim 1 further comprising ascertaining a travel behavior of at least one vehicle traveling ahead using the virtual map and environment data, wherein the travel behavior further defines the travel path.

7. A vehicle, comprising:
   a data-processing unit programmed to ascertain
      a travel path of the vehicle across a roadway situated ahead in a direction of travel of the vehicle, the travel path being defined by a running condition of the vehicle, a virtual and local map that contains local wind conditions, a location of the vehicle on the map, and vehicle environment data,
a relative position of the vehicle in a roadway lane or an instantaneous spacing of the vehicle from a second vehicle traveling ahead based on the environment data, and
an entry time and location that the vehicle enters a lateral wind shadow of the second vehicle within the travel path, and an exit time and location that the vehicle exits the lateral wind shadow of the second vehicle within the travel path based on the running condition and environment data; and
a device, actuated by the data-processing unit, configured to influence the running condition of the vehicle to move the vehicle along the travel path based on the relative position of the vehicle, the entry time and location, and the exit time and location.

8. The vehicle as claimed in claim 7, wherein the device is a steering-assist device.

9. The vehicle as claimed in claim 7 further comprising at least one sensor-electronics unit connected to the data-processing unit by communications technology, and programmed to capture location and time-dependent crosswind loads acting on the vehicle,
wherein the data-processing unit is further programmed to transmit data relating to the crosswind loads via a wireless communications link to a central communications unit that is separate from the vehicle and is programmed to generate the map.

10. The vehicle as claimed in claim 7 further comprising at least one image-capture unit, connected to the data-processing unit by communications technology, and looking at least in the direction of travel, the image-capture unit being programmed to capture at least one item of information relating to an environment of the vehicle.

11. The vehicle as claimed in claim 7, wherein the data-processing unit is further programmed to estimate, based on the map and the environment data, a travel behavior of the second vehicle traveling ahead on the roadway, and, based on the travel behavior, define the travel path.

12. A vehicle steering assist system, comprising:
a communications unit, separate from the vehicle, programmed to generate a map containing wind conditions;
a processing unit, connected to the communications unit, programmed to ascertain a travel path defined by a vehicle condition, a vehicle location on the map, vehicle environment data, and wind conditions, and programmed to ascertain, via the vehicle condition and vehicle environment data, an entry time and location that the vehicle enters a lateral wind shadow of a second vehicle disposed along the travel path, and an exit time and location that the vehicle exits the lateral wind shadow of the second vehicle; and
a device, actuated by the processing unit, configured to influence the vehicle condition as the vehicle moves along the travel path based on the entry time and location and the exit time and location.

13. The vehicle steering assist system as claimed in claim 12 further comprising an electronics unit, connected to the processing unit, programmed to capture location and time-dependent crosswind loads acting on the vehicle, wherein the processing unit is further programmed to transmit data relating to the crosswind loads via a wireless communications link to the communications unit.

14. The vehicle steering assist system as claimed in claim 12, wherein the processing unit is further programmed to ascertain, based on the vehicle environment data, a relative position of the vehicle in a lane of a roadway and a spacing of the vehicle from a second vehicle traveling ahead.

15. The vehicle steering assist system as claimed in claim 12 further comprising an image-capture unit, connected to the processing unit and facing a direction of travel, programmed to capture information relating to the vehicle environment data.

16. The vehicle steering assist system as claimed in claim 12, wherein the processing unit is further programmed to estimate, based on the map and vehicle environment data, a travel behavior of a second vehicle, and, based on the travel behavior, further define the travel path.

* * * * *